United States Patent

[11] 3,603,734

[72] Inventor Robert C. Woodhead
Ottawa, Ontario, Canada
[21] Appl. No. 146,015
[22] Filed Feb. 24, 1950
[45] Patented Sept. 7, 1971
[73] Assignee The Minister of National Defense of Canada

[54] SECRET SIGNALLING SYSTEM
2 Claims, 4 Drawing Figs.

Figure 1:
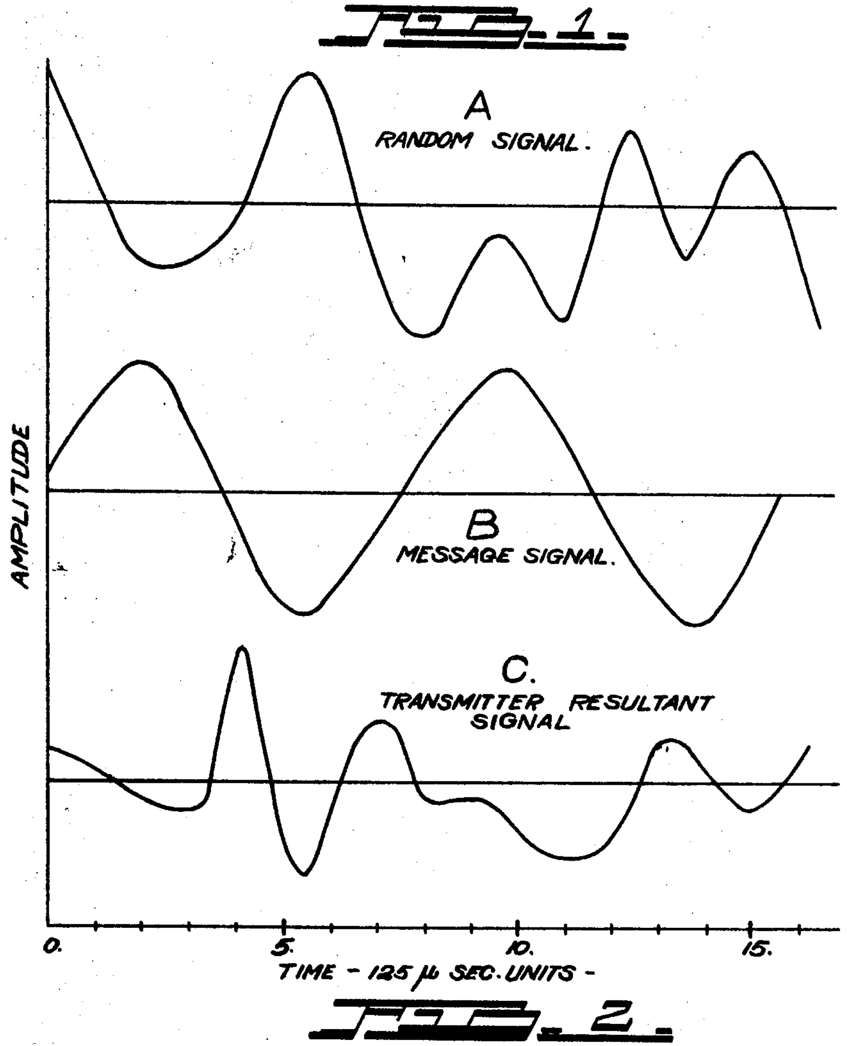

[52] U.S. Cl. .......... 179/1.5 C, 178/22, 179/1.5 E
[51] Int. Cl. .......... H04m 1/68
[50] Field of Search .......... 179/15.6, 1.5; 178/43.5, 22

[56] References Cited

UNITED STATES PATENTS

| | | | |
|---|---|---|---|
| 2,401,406 | 6/1946 | Bedford | 179/1.5 |
| 2,402,058 | 6/1946 | Loughren | 179/1.5 |
| 2,406,350 | 8/1946 | Harrison | 179/1.5 |
| 2,406,790 | 9/1946 | Beatty | 179/1.5 |
| 2,426,225 | 8/1947 | Krause | 179/1.5 |
| 2,479,338 | 8/1949 | Gabrilovitch | 179/1.5 |
| 2,510,054 | 6/1950 | Alexander et al. | 179/15.6 |
| 2,517,587 | 8/1950 | Mohr | 179/1.5 |

*Primary Examiner*—Rodney D. Bennett, Jr.
*Assistant Examiner*—Daniel C. Kaufman
*Attorney*—Smart & Biggar

CLAIM: Secret signalling apparatus comprising a source of a message signal to be transmitted, means for producing a transmitter random signal and a transmitter synchronizing signal from a transcription, means for producing a transmitter pulse code sampling frequency having a predetermined phase and frequency relationship with the transmitter synchronizing signal, a first and a second transmitter pulse code modulator each responsive to said sampling frequency and connected respectively to pulse code modulate the transmitter random signal and to pulse code modulate the message signal thereby determining the polarity of each of said transmitter random signal and said message signal at any instant, means adapted to compare the pulse code modulated message signal with the pulse code modulated transmitter random signal and to produce a pulse code modulated transmitter resultant signal comprising a pulse for each occurrence of a predetermined polarity relationship between the pulse code modulated message signal and the pulse code modulated transmitter random signal, a pulse code demodulator responsive to said sampling frequency and connected to demodulate the transmitter resultant signal, transmitter means arranged to transmit the transmitter synchronizing signal and the pulse code demodulated transmitter resultant signal to a receiver, receiver filter means adapted to separate the transmitter synchronizing signal from the pulse code demodulated transmitter resultant signal, means for producing a receiver random signal and a receiver synchronizing signal from a duplicate of said transcription, means for unison-synchronizing the receiver synchronizing signal with the received transmitter synchronizing signal, means responsive to the transmitter synchronizing signal and adapted to produce a receiver pulse code sampling frequency having the same phase and frequency relationship with the received transmitter synchronizing signal as the transmitter sampling frequency has with the transmitter synchronizing signal, a first receiver pulse code modulator responsive to the receiver pulse code sampling frequency and connected to pulse code modulate the receiver random signal and thereby to determine its polarity at any instant, a second receiver pulse code modulator responsive to the receiver pulse code sampling frequency and connected to pulse code modulate the pulse code demodulated transmitter resultant signal and thereby to determine its polarity at any instant so producing a pulse code modulated receiver interim signal, means adapted to compare the pulse code modulated receiver interim signal with the pulse code modulated receiver random signal and to produce a pulse code modulated receiver resultant signal comprising a pulse for each occurrence of said predetermined polarity relationship between the receiver interim signal and the pulse code modulated receiver random signal, and a pulse code demodulator arranged to pulse code demodulate the receiver resultant signal.

INVENTOR -
ROBERT C. WOODHEAD.
BY- Smart & Biggar.
ATTY'S -

TRANSMITTER.

INVENTOR
ROBERT C. WOODHEAD.
BY- Smart & Biggar.
ATTY'S.

INVENTOR
ROBERT C. WOODHEAD
BY Smart & Biggar
ATTYS

SECRET SIGNALLING SYSTEM

The invention relates to a secret signalling system in which secrecy is obtained by use of a random signal key and by pulse modulation technique.

It is generally recognized that, in a secret signalling system, a highly satisfactory form for the transmitted signal would be one which an unauthorized person would be unable to distinguish from random noise. Prior to the present invention, use of random noise in a secret signalling system was usually by way of directly superimposing the noise on the message signal to be transmitted and, when use of a narrow bandwidth of noise was resorted to, the noise component had to be of high amplitude as compared to that of the message signal component so that in the case of unauthorized reception the received noise would not only overpower the part of the message signal falling within the bandwidth of the noise, but also the parts outside the bandwidth of the noise. This system is obviously wasteful of transmitter power since provision has to be made for the high noise level without benefit to the power of the transmitted message signal. Moreover, there was a possibility of reception of the message signal by anyone who provided a filter in his receiving equipment which would eliminate signals within the bandwidth of the noise. On the other hand, if a wide bandwidth of noise was used, the noise component could be of less amplitude than in the case of a narrow bandwidth of noise, but the amplitude of the noise component still had to be greater than that of the message signal component to obtain even theoretical masking of the message signal component. In practice, it is found that the wide band noise component must be considerably greater in magnitude than the message signal component and, in addition, it has been found difficult effectively to cancel out the noise component at a receiver to provide authorized reception of the message signal.

According to the invention these disadvantages are overcome, and a secret signalling system is provided in which the message bearing signal transmitted from the transmitter to the receiver is of a random nature and cannot be distinguished by an unauthorized person from random noise. According to the invention, secret signalling apparatus comprises a source of a message signal to be transmitted, means for producing a transmitter random signal and a transmitter synchronizing signal from a transcription, means for producing a transmitter pulse code sampling frequency having a predetermined phase and frequency relationship with the transmitter synchronizing signal, a first and a second transmitter pulse code modulator each responsive to said sampling frequency and connected respectively to pulse code modulate the transmitter random signal, and to pulse code modulate the message signal, means adapted to compare the pulse code modulated message signal with the pulse code modulated transmitter random signal and to produce a pulse code modulated transmitter resultant signal comprising a pulse for each occurrence of a predetermined polarity relationship between the pulse code modulated message signal and the pulse code modulated transmitter random signal, a pulse code demodulator responsive to said sampling frequency and connected to demodulate the transmitter resultant signal, transmitter means arranged to transmit the transmitter synchronizing signal and the pulse code demodulated transmitter resultant signal to a receiver, receiver filter means adapted to separate the transmitter synchronizing signal from the pulse code demodulated transmitter resultant signal, means for producing a receiver random signal and a receiver synchronizing signal from a duplicate of said transcription, means for unison-synchronizing the receiver synchronizing signal with the received transmitter synchronizing signal, means responsive to the transmitter synchronizing signal and adapted to produce a receiver pulse code sampling frequency having the same phase and frequency relationship with the received transmitter synchronizing signal as the transmitter sampling frequency has with the transmitter synchronizing signal, a first receiver pulse code modulator responsive to the receiver pulse code sampling frequency and connected to pulse code modulate the receiver random signal, a second receiver pulse code modulator responsive to the receiver pulse code sampling frequency and connected to pulse code modulate the pulse code demodulated transmitter resultant signal to produce a pulse code modulated receiver interim signal, means adapted to compare the pulse code modulated receiver interim signal with the pulse code modulated receiver random signal and to produce a pulse code modulated receiver resultant signal comprising a pulse for each occurrence of said predetermined polarity relationship between the receiver interim signal and the pulse code modulated receiver random signal, and a pulse code demodulator arranged to pulse code demodulate the receiver resultant signal.

The term "unison-synchronizing" is used in the present specification and the attached claims in connection with the synchronizing of a signal with that produced from a transcription of the same signal. The word "synchronizing" in itself denotes bringing the signal and that from its transcription into agreement in respect to phase with regard to each cycle successive to the cycle at which synchronization is achieved. The term "unison-synchronizing" is used to denote synchronizing a signal and that from its transcription in such manner that, at the time of synchronization, the signals are in the same relationship to each other as if they had been in synchronization from the first cycle of each signal.

In a secret signalling system according to the invention, transmission between the transmitter and the receiver may be of the same type as would be used to transmit the message if it were not made secret. For example, transmission between the transmitter and the receiver might be by an audio frequency telephone line, a carrier frequency telephone line, or a radio link. A preferred form of random signal for the method according to the invention is random noise which may be obtained from such well known sources as tube noise or granular resistance noise.

Pulse code modulation is a form of pulse modulation which has been known for several years and which is described in U.S. Pat. No. 2,272,070, Feb. 3, 1942, A.H. Reeves. In pulse modulation, the wave form to be transmitted is sampled at the transmitter at predetermined instants (for example 8000 times per second i.e. a sampling frequency of 8 Kc.), and at these instants signal elements are transmitted to the receiver which convey the amplitude information. In pulse code modulation, the amplitude range of the waveform to be transmitted is divided into a finite number (for example 32) of predetermined amplitude values according to the degree of fidelity required. The instantaneous amplitude value of the waveform to be transmitted at each predetermined instant is transmitted in a signal code representing the nearest predetermined amplitude value above or below the instantaneous amplitude value. The number of elements in the code may vary but, for the example of 32 amplitude values, may comprise a group of five pulses and, since any given pulse can be either absent or present, the number of possible arrangements is $2^5$ or 32.

Figure 2:
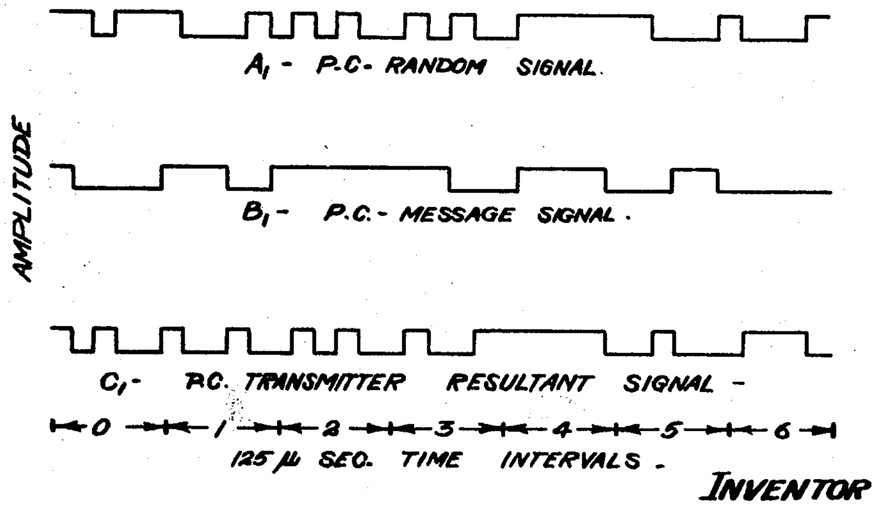
Figure 3:
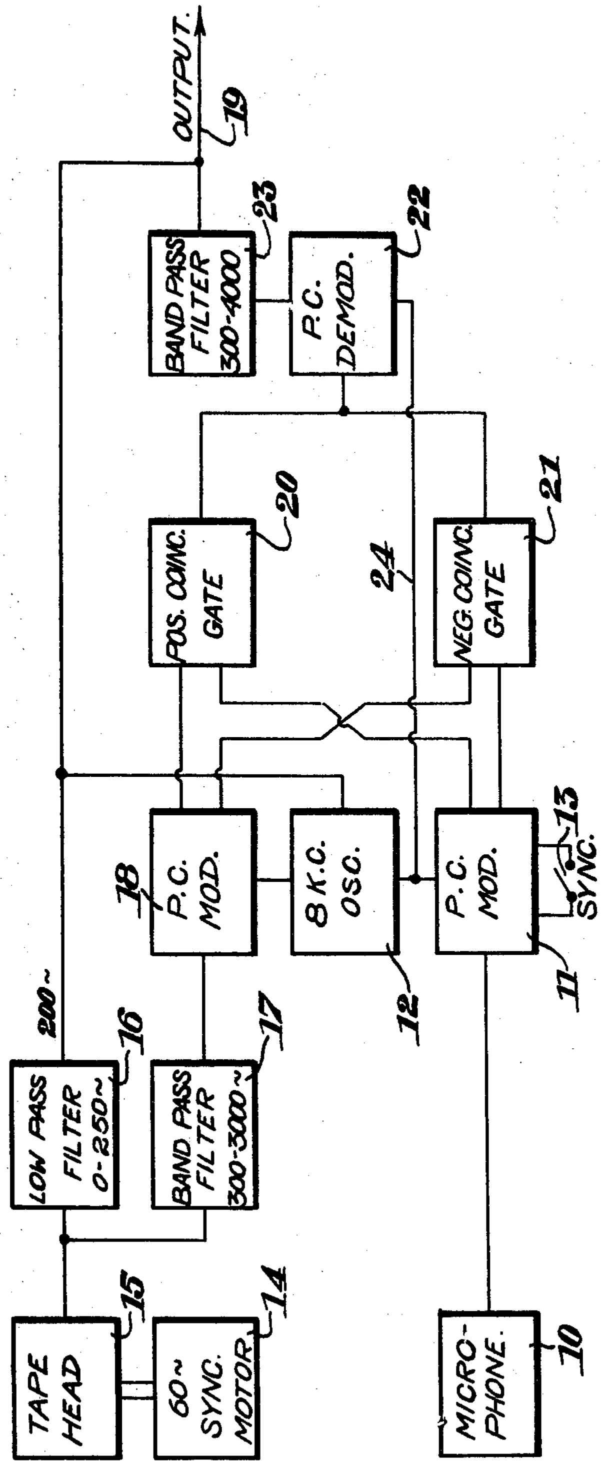
Figure 4:
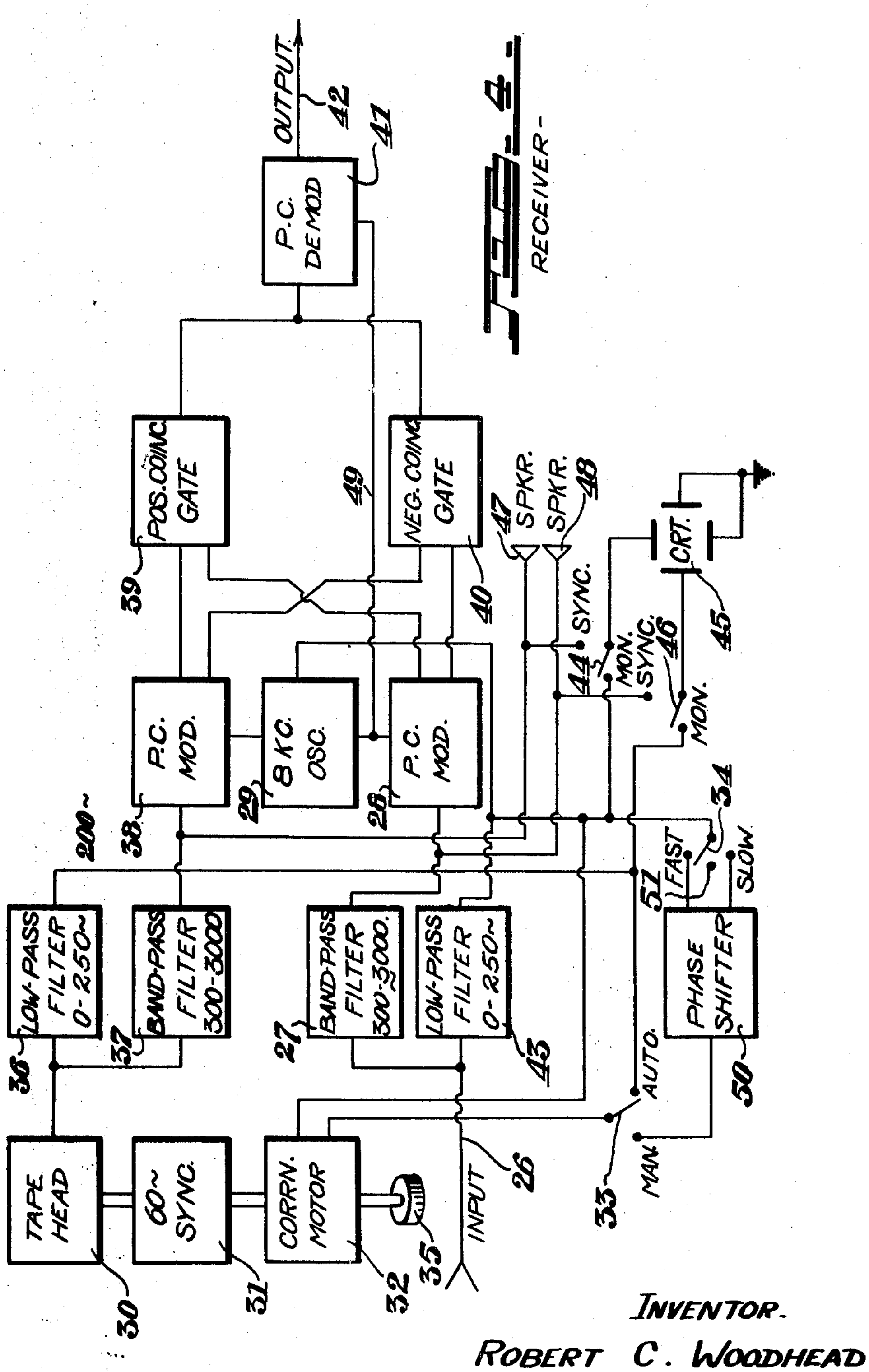

The invention will be further described by reference to the attached drawings, in which FIG. 1 is a graph having amplitude against time and showing curves for a sample random signal, a sample message signal and a sample transmitter resultant signal, in amplitude modulated form, FIG. 2 is a graph having amplitude against time and showing the curves of FIG. 1 in pulse code modulated form, FIG. 3 is a block diagram of a transmitter suitable for use in a method according to the invention, and FIG. 4 is a block diagram of a receiver suitable for use in a method according to the invention.

In FIG. 3, a transmitter according to the invention is shown in block diagram form with each block representing a well known piece of equipment. A microphone and associated amplifier 10 is shown as the source of the message signal, but it might instead be some other source such as a telephone line or a recording. The audio output of the microphone 10 is fed to a pulse code modulator 11 adapted to provide a five element code and which has its amplitude sampling rate set at 8 Kc. by an oscillator 12. The modulator 11 has a synchronization switch 13 which can be closed during absence of any message signal from the microphone 10 to apply to the modulator 11 the signal level which corresponds to production of all five elements of the code. The use of the switch 13 will be described below in connection with the operation of the circuits.

The random signal is produced from a magnetic tape transcription driven by a 60-cycle synchronous motor 14 past a tape head and associated amplifier 15, and is fed to a 0–250-cycle low-pass filter 16 and a 300–3000-cycle band-pass filter 17. The output of the filter 17 connects to a pulse code modulator 18 which has its amplitude sampling rate set at 8 Kc. in synchronism with that of the modulator 11 by the oscillator 12. The oscillator 12 has a connection to the output of the filter 16 for synchronizing purposes, and the output of the filter 16 is also connected to the output connection 19 of the transmitter.

An output connection from each of the modulators 11 and 18 connects to the input of a positive coincidence gate 20 and to the input of a negative coincidence gate 21. The output of the gates 20 and 21 connect to the input of a pulse code demodulator 22 having its output connected through a 300–4000 band-pass filter 23 to the output connection 19 of the transmitter. The modulating sampling frequency 8 Kc. is supplied to the demodulator 22 by a connection 24 from the oscillator 12 for synchronization of the demodulator 22.

As shown in FIG. 4, the receiver has an input connection 26 to which is applied the signal transmitted from the output connection 19 of the transmitter. The input connection 26 connects through 300–3000 cycle band-pass filter 27 to a pulse code modulator 28 which has its amplitude sampling rate set at 8 Kc. by an oscillator 29. The receiver random signal rate is produced from a duplicate of the magnetic taps transcription used at the transmitter. The duplicate transcription is driven past a tape head 30 by a 60-cycle synchronous motor 31 having its stator mounted on bearings so that it may be rotated by a two phase correction motor 32. Switches 33 and 34 are provided so that the correction motor 32 may be operated in either direction as a phase shift motor under manual or automatic control and, in addition, a fine control for manual operation is provided by a knob 35 on the correction motor 32.

The tape head 30 is connected to a 0–250-cycle low-pass filter 36 and a 300–3000-cycle band-pass filter 37. The band-pass filter 37 connects to a pulse modulator 38 which has its amplitude sampling rate set in synchronism with the pulse code modulator 28 by the oscillator 29. The output of each pulse code modulator 28 and 38 connects to a positive coincidence gate 39 and to a negative coincidence gate 40. The output of the gates 39 and 40 are combined in the input to a pulse code demodulator 41 having an output connection 42 and a connection 49 to the oscillator 29.

At the receiver, a 0–250 cycle low-pass filter 43 separates the transmitter synchronizing signal from the pulse code demodulated transmitter resultant signal received on the input connection 26 and supplies the transmitter synchronizing signal to the oscillator 29, to the correction motor 32, to the armature of the switch 34 and to the "monitor" contact of a switch 44. The armature of the switch 44 connects to a vertical deflecting plate of a cathode-ray tube 45 of an oscilloscope (not shown). The other vertical plate of the cathode-ray tube 45 is connected to ground as well as one of the horizontal plates. The other horizontal plate connects to the armature of a switch 46 having a "monitor" contact to which is supplied the 200 cycle synchronizing signal from the low-pass filter 36. The synchronizing signal from the low-pass filter 36 is also supplied to the contact marked "automatic" of the switch 33. The manual contact of the switch 33 connects to the output of a phase shifter 50 having input connections from the contacts "fast" and "slow" of the switch 34. A loudspeaker 47 is connected to the output of the band-pass filter 37 and to the "sychronization" contact of the switch 44. Another loudspeaker 48 is connected to the output of the band-pass filter 27, and these loudspeakers are used for monitoring and synchronizing purposes.

The receiver synchronizing signal generated by the magnetic tape passing the tape head 30 at the receiver must be unison-synchronized with the transmitter synchronizing signal which appears at the output of the low-pass filter 43 or, in other words as mentioned above, the signals must be brought into the same relationship to each other as if they had been in synchronization from the first cycle of each signal. The system may be operated with the receiver producing its output simultaneously with the output of the transmitter, or the received output of the transmitter may be recorded and later applied to the input of the receiver for decoding. Therefore in explaining the operation of the system, reference will not be made to synchronizing the operation of the receiver with that of the transmitter, but rather the synchronizing of the receiver will be referred to the received signal (containing the transmitter synchronizing signal) at the input 26 of the receiver. At the transmitter, the switch 13 is closed and the transmission is begun by starting the synchronous motor 14 which causes the magnetic tape containing the recorded transmitter random signal together with the transmitter synchronizing signal to move past the tape 15. The first part of the transmitter synchronizing signal consists of signals which can be used in unison-synchronizing the receiver synchronizing signal with the transmitter synchronizing signal, and it is after the unison-synchronizing signals have passed the tape head 15 that the message signal from the microphone 10 should be applied to the pulse code modulator 11. The first unison-synchronizing signal is spoken numbers, the second is a sine wave varying in frequency from 300–3000 cycles once every five seconds, the third is the same as the second except that the recurrence interval is half a second, and the final unison-synchronizing signal is a steady 2,500-cycle tone. With the switch 13 closed, the modulator 11 produces continuously a train of positive pulses which allow the unison-synchronizing signals to pass the coincidence gates 20 and 21 and to be demodulated by the demodulator 22 for transmission in the same form as they are recorded on the tape. When the unison-synchronizing signals have been transmitted, and prior to applying a message signal to the modulator 11, the switch 13 is opened. The transmitter random signal from the tape head 15 has the 200-cycle transmitter synchronizing signal filtered from it by the low-pass filter 16. The 200-cycle signal from the filter 16 is used to determine the frequency of the oscillator 12 and it is supplied to the output 19 of the transmitter. The transmitter random signal is passed by the band-pass filter 17 to the pulse code modulator 18. The transmitter random signal and the message signal are pulse code modulated by the modulators 18 and 11 which sample the amplitudes of the signals in synchronism at a frequency set by the oscillator 12 at 8 Kc.

The waveforms of the signals up to the output of the modulators 18 and 11 are shown by the curves A and B of FIG. 1, and the curves $A_1$ and $B_1$ of FIG. 2. The curves A and B are those of the random signal and the message signal for a period of 2000 microseconds, and the curves $A_1$ and $B_1$ show these signals in pulse code modulated form for the first seven sampled amplitudes. Signals of the waveform of curves $A_1$ and $B_1$ are applied to the input of the positive coincidence gate 20 and to the input of the negative coincidence gate 21. During each occurrence of coincidence of the pulses in a positive direction a pulse is produced by the positive coincidence gate 20 and fed to the pulse code demodulator 22. During each occurrence of coincidence in a negative direction (quiescent condition) of the curves $A_1$ and $B_1$ the negative coincidence gate 21 supplies a pulse to the pulse code demodulator 22. When the curves $A_1$ and $B_1$ are neither coincident in a positive or negative direction, no pulse is supplied to the pulse code demodulator 22. The resultant signal of the action of the positive and negative coincidence gates 20 and 21 is to produce a curve of the wave shape shown by the curve $C_1$ of FIG. 2, and this is the waveform of the transmitter resultant signal applied to the input of the pulse code demodulator 22. Upon demodulation of the transmitter resultant signal, a signal for transmission is produced having the amplitude modulation form shown in curve C of FIG. 1, and this is the waveform of the signal which is fed through the band-pass filter 23 to the output connection 19. The output of the transmitter appearing on the connection 19 is then the combination of the transmitter synchronizing signal from the low-pass filter 16, and the pulse code demodulated transmitter resultant signal from the band-pass filter 23. The output connection 19 may lead to the transmitter of a radio link or to a telephone line of transmission to the receiver.

At the receiver, movement of the magnetic tape containing a duplicate of the transcription of the transmitter random signal must be controlled for the purpose of unison-synchronizing the receiver synchronizing signal with the transmitter synchronizing signal received at the input connection 26 of the receiver. Since the first unison-synchronizing signals are spoken numbers, the spoken numbers from the tape 30 and from the input connection 26 may be brought nearly into coincidence by the correction motor 32 when the switch 33 is in the manual position and the switch is operated to its "fast" or "slow" positions depending on whether the magnetic tape at the receiver is fast or slow as determined by listening to the loudspeakers 47 and 48. When the switch 34 is in its midposition 51, the correction motor 32 is stationary. The second unison-synchronizing signal, consisting of a sine wave varying in frequency, from 300 to 3000 cycles once every 5 seconds, is applied to the plates of the cathode-ray tube 45 with the signals from the tape head 30 being applied to the vertical plate of the cathode-ray tube 45 from the synchronization contact of the switch 44. The signals from the input connection 26 are supplied to the horizontal plates through the synchronization contact of the switch 46. Upon unison-synchronizing the signals by manipulation of the switch 34, a straight line at an angle of 45° will appear on the screen of the cathode-ray tube 45. During the unison-synchronizing of the signals, the amount of error at any given time can be calculated from the Lissajou figure appearing on the screen of the cathode-ray tube 45. The next unison-synchronizing signal is the same as the previous one except it has a recurrence interval of half a second and the degree of error can be further reduced by a factor of 10. The final unison-synchronizing signal consists of a steady 2,500-cycle tone which permits adjustment of the phase. The switch 33 is now set to its "automatic" position so that the correction motor 32 is controlled by phase differences between the transmitter and the receiver synchronizing signals. At any time small errors in the unison-synchronizing of the signals may be corrected by the annual control knob 35. This method of unison-synchronizing signals is well known in the art and is not claimed per se as an invention in the present application.

Upon unison-synchronizing of the receiver synchronizing signal with the transmitter synchronizing signal received at the input connection 26, the decoding process begins by the receiver random signal being supplied by the band-pass filter 37 to the pulse code modulator 38 while the band-pass filter 27 supplies the transmitter resultant signal to the pulse code modulator 28. The pulse code modulators 28 and 38 operate in synchronism with their sampling rates set at 8 Kc. by the oscillator 29 which is synchronized by the transmitter synchronizing signal from the filter 43.

The waveforms up to this point in the operation of the receiver may be considered by referring to FIG. 1 and 2 in which the curve A represents the random signal produced by the tape head 30 and supplied by the band-pass filter 37 to the modulator 38, and the curve C represents the transmitter resultant signal received at the input connection 26 and supplied by the band-pass filter 27 to the pulse code modulator 28. The output waveform of the pulse code modulator 38 is represented by the curve $A_1$, and the output waveform of the pulse code modulator 28 is represented by the curve $C_1$. The pulse code modulators 28 and 38 supply signals having the waveforms $A_1$ and $C_1$ to the input of the positive coincidence gate 39 and to the input of the negative coincidence gate 40. The operation of the coincidence gates 39 and 40 is similar to that of the coincidence gates 20 and 21 at the transmitter. The result of the operation of the coincidence gates 39 and 40 to produce pulses upon positive or negative coincidence of pulses from the modulators 28 and 38 is to produce a signal of the waveform $B_1$ at the input of the pulse code demodulator 41. When the pulse code modulated message signal represented by the waveform $B_1$ is demodulated in the pulse code demodulator 41, a signal of the same waveform as the message signal (curve B) is produced on the output connection 42. Small adjustments in the synchronism of the receiver random signal and the transmitter random signal can be made during operation by manual adjustment of the knob 35 for minimum background noise in the output signal at the connection 42.

As graphically shown in FIGS. 1 and 2, a secret signalling system according to the invention produces for transmission a signal (waveform C of FIG. 1) which is indistinguishable from random noise except possibly for its being superimposed upon a carrier frequency and for its accompanying synchronizing signal. However, even although an unauthorized person received the carrier frequency and the synchronizing signal, he would have no means of knowing that any other intelligence was being conveyed by the carrier which he had happened upon. It would merely appear to him that he was receiving a carrier modulated by a 200-cycle tone and produced by a transmitter having a great deal of noise in its output signal. However, an authorized person having a duplicate of the magnetic tape bearing the random signal used at the transmitter may receive the messages which are automatically decoded upon unison-synchronizing the receiver random signal with the received transmitter random signal.

I claim:

1. Secret signalling apparatus comprising a source of a message signal to be transmitted, means for producing a transmitter random signal and a transmitter synchronizing signal from a transcription, means for producing a transmitter pulse code sampling frequency having a predetermined phase and frequency relationship with the transmitter synchronizing signal, a first and a second transmitter pulse code modulator each responsive to said sampling frequency and connected respectively to pulse code modulate the transmitter random signal and to pulse code modulate the message signal thereby determining the polarity of each of said transmitter random signal and said message signal at any instant means adapted to compare the pulse code modulated message signal with the pulse code modulated transmitter random signal and to produce a pulse code modulated transmitter resultant signal comprising a pulse for each occurrence of a predetermined polarity relationship between the pulse code modulated message signal and the pulse code modulated transmitter random signal, a pulse code demodulator responsive to said sampling frequency and connected to demodulate the transmitter resultant signal, transmitter means arranged to transmit the transmitter synchronizing signal and the pulse code demodulated transmitter resultant signal to a receiver, receiver filter means adapted to separate the transmitter synchronizing signal from the pulse code demodulated transmitter resultant signal, means for producing a receiver random signal and a receiver synchronizing signal from a duplicate of said transcription, means for unison-synchronizing the receiver synchronizing signal with the received transmitter synchronizing signal, means responsive to the transmitter synchronizing signal and adapted to produce a receiver pulse code sampling frequency the same phase and frequency relationship with the received transmitter synchronizing signal as the transmitter sampling frequency has with the transmitter synchronizing signal, a first receiver pulse code modulator responsive to the receiver pulse code sampling frequency and connected to pulse code modulate the receiver random signal and thereby to determine its polarity at any instant a second receiver pulse code modulator responsive to the receiver pulse code sampling frequency and connected to pulse code modulate the pulse code demodulated transmitter resultant signal and thereby to determine its polarity at any instant so producing a pulse code modulated receiver interim signal, means adapted to compare the pulse code modulated receiver interim signal with the pulse code modulated receiver random signal and to produce a pulse code modulated receiver resultant signal comprising a pulse for each occurrence of said predetermined polarity relationship between the receiver interim signal and the pulse code modulated receiver random signal, and a pulse code demodulator arranged to pulse code demodulate the receiver resultant signal.

2. Secret signalling apparatus as defined in claim 1 in which the means adapted to compare the pulse code modulated message signal with the pulse code modulated transmitter random signal is a positive and negative coincidence gate and the means adapted to compare the pulse code modulated receiver interim signal with the pulse code modulated receiver random signal is a positive and a negative coincidence gate.